United States Patent
Patzer

(10) Patent No.: US 9,286,639 B1
(45) Date of Patent: Mar. 15, 2016

(54) SYSTEM AND METHOD FOR PROVIDING PRICE INFORMATION

(75) Inventor: Aaron Patzer, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 469 days.

(21) Appl. No.: 12/655,504

(22) Filed: Dec. 31, 2009

Related U.S. Application Data

(63) Continuation-in-part of application No. 11/809,272, filed on May 30, 2007, now Pat. No. 7,840,456.

(60) Provisional application No. 61/142,150, filed on Dec. 31, 2008.

(51) Int. Cl.
    *G07B 17/00* (2006.01)
    *G07F 19/00* (2006.01)
    *G06Q 40/00* (2012.01)
    G06Q 30/06 (2012.01)
    G06Q 20/20 (2012.01)
    G06Q 10/08 (2012.01)

(52) U.S. Cl.
    CPC .............. *G06Q 40/10* (2013.01); *G06Q 10/087* (2013.01); *G06Q 20/203* (2013.01); *G06Q 30/0601* (2013.01)

(58) Field of Classification Search
    None
    See application file for complete search history.

(56) References Cited

U.S. PATENT DOCUMENTS

| | | | | |
|---|---|---|---|---|
| 4,799,156 A | * | 1/1989 | Shavit et al. | 705/26.3 |
| 6,338,050 B1 | * | 1/2002 | Conklin et al. | 705/80 |
| 6,473,740 B2 | * | 10/2002 | Cockrill et al. | 705/26.81 |
| 7,840,462 B2 | * | 11/2010 | Hansen | 705/35 |
| 7,953,630 B2 | * | 5/2011 | Fowler et al. | 705/14.26 |
| 2002/0016749 A1 | * | 2/2002 | Borecki et al. | 705/26 |
| 2004/0133526 A1 | * | 7/2004 | Shmueli et al. | 705/80 |
| 2006/0218120 A1 | * | 9/2006 | Juang | 707/1 |
| 2007/0136140 A1 | * | 6/2007 | Smith, Jr. | 705/26 |
| 2007/0244741 A1 | * | 10/2007 | Blume et al. | 705/10 |
| 2007/0299732 A1 | * | 12/2007 | Gluzberg et al. | 705/26 |
| 2008/0275777 A1 | * | 11/2008 | Protheroe et al. | 705/14 |
| 2009/0055266 A1 | * | 2/2009 | Brody et al. | 705/14 |
| 2009/0265211 A1 | * | 10/2009 | May et al. | 705/9 |
| 2010/0191580 A1 | * | 7/2010 | Chatter et al. | 705/10 |

* cited by examiner

*Primary Examiner* — Ryan Zeender
*Assistant Examiner* — Christopher Buchanan
(74) *Attorney, Agent, or Firm* — Park, Vaughan, Fleming & Dowler LLP

(57) ABSTRACT

A system and method uses categorized transaction data to respond to requests for pricing information about one or more merchants corresponding to a subset of the transaction data.

9 Claims, 4 Drawing Sheets

US 9,286,639 B1

SYSTEM AND METHOD FOR PROVIDING PRICE INFORMATION

RELATED APPLICATIONS

This application claims the benefit of U.S. Provisional Patent Application Ser. No. 61/142,150, entitled, "System and Method for Providing Price Information" filed on Dec. 31, 2008 by Aaron Patzer, and is a continuation in part of U.S. patent application Ser. No. 11/809,272 entitled "System and Method for Categorizing Credit Card Transaction Data" filed by Aaron Patzer on May 30, 2007, now U.S. Pat. No. 7,840,456 each having the same assignee as this application and each is hereby incorporated herein by reference in its entirety.

FIELD OF THE INVENTION

The present invention is related to computer software and more specifically to computer software for financial analysis.

BACKGROUND OF THE INVENTION

Many users would like to have an idea of prices that merchants charge. This sort of information is generally unavailable, as the parties with the information, the merchants themselves, may not adequately track it or may not wish to share it with people who would like to see it, for fear that a competitor would use it to their advantage.

What is needed is a system and method for accurately identifying pricing and other information about transactions between merchants and their customers.

SUMMARY OF INVENTION

A system and method collects transaction data from credit card and other transaction data supplied by a large group of people made with multiple merchants, categorizes it and identifies the name of the merchant as described in the parent application, then generates, stores in a tangible computer medium and provides for display, for certain merchants or merchant locations, pricing information such as average transaction price, and graphical information, such as a set of bar charts, or uses other conventional display techniques to present data requested by a user. The user may be a merchant attempting to identify information about their own business or other businesses, or a potential purchaser of a product or service offered by one or more or an existing customer of a merchant.

Pricing information may be provided from the transaction information for a single merchant, multiple merchants, all merchants in a category, individual merchant locations, and merchants that share the same customers. The pricing information may be limited to merchant locations in a specified area. The transaction data may be filtered and/or weighted, for example based on the date of the transaction.

The pricing information may be used by a merchant to open, close, improve or study individual locations, set prices or identify promotions, which may be targeted against an industry or a set of one or more merchants. The pricing information may be used by a potential purchaser to identify one or more merchants in which the user may be interested in purchasing products or services, or to verify that the merchant with which the user already does business is providing a competitive price for the products or services that user uses, or to identify himself or herself as a heavy user of a merchant's products and/or services, so that the user can attempt to secure a better price from that merchant or other merchants.

DETAILED DESCRIPTION OF A PREFERRED EMBODIMENT

Figure 1A:
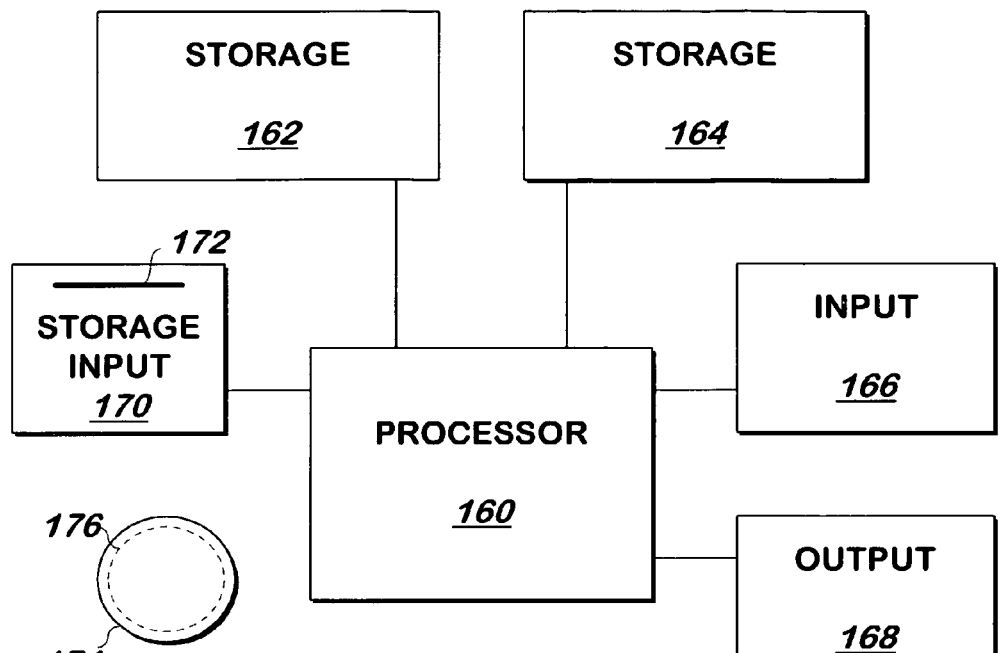
FIG. 1A is a block schematic diagram of a conventional computer system.
Figure 1B:
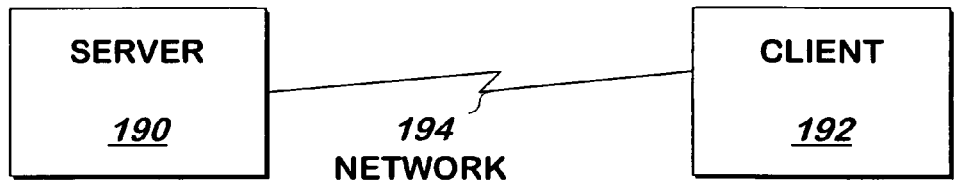
FIG. 1B is a block schematic diagram of a conventional client-server system.

The present invention may be implemented as computer software on a conventional computer system. Referring now to FIG. 1A, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used.

In one embodiment, any data generated as described herein is stored, at least temporarily, in a tangible computer media such as storage 162, 164 or both, thereby fixing it in a tangible computer media.

The system may be implemented as a conventional client-server computer system, in which one or more servers 190 provide the capabilities described herein to one or more clients 192 via a network 194 such as the Internet. There may be any number of clients coupled to any number of servers. Reports may be requested by a user at client 192. The client 192 provides the request to a server 190, which fulfills the request and provides the results via one or more web pager to a browser at client 192, which renders the pages and displays them to a user on a conventional display.

Figure 2:
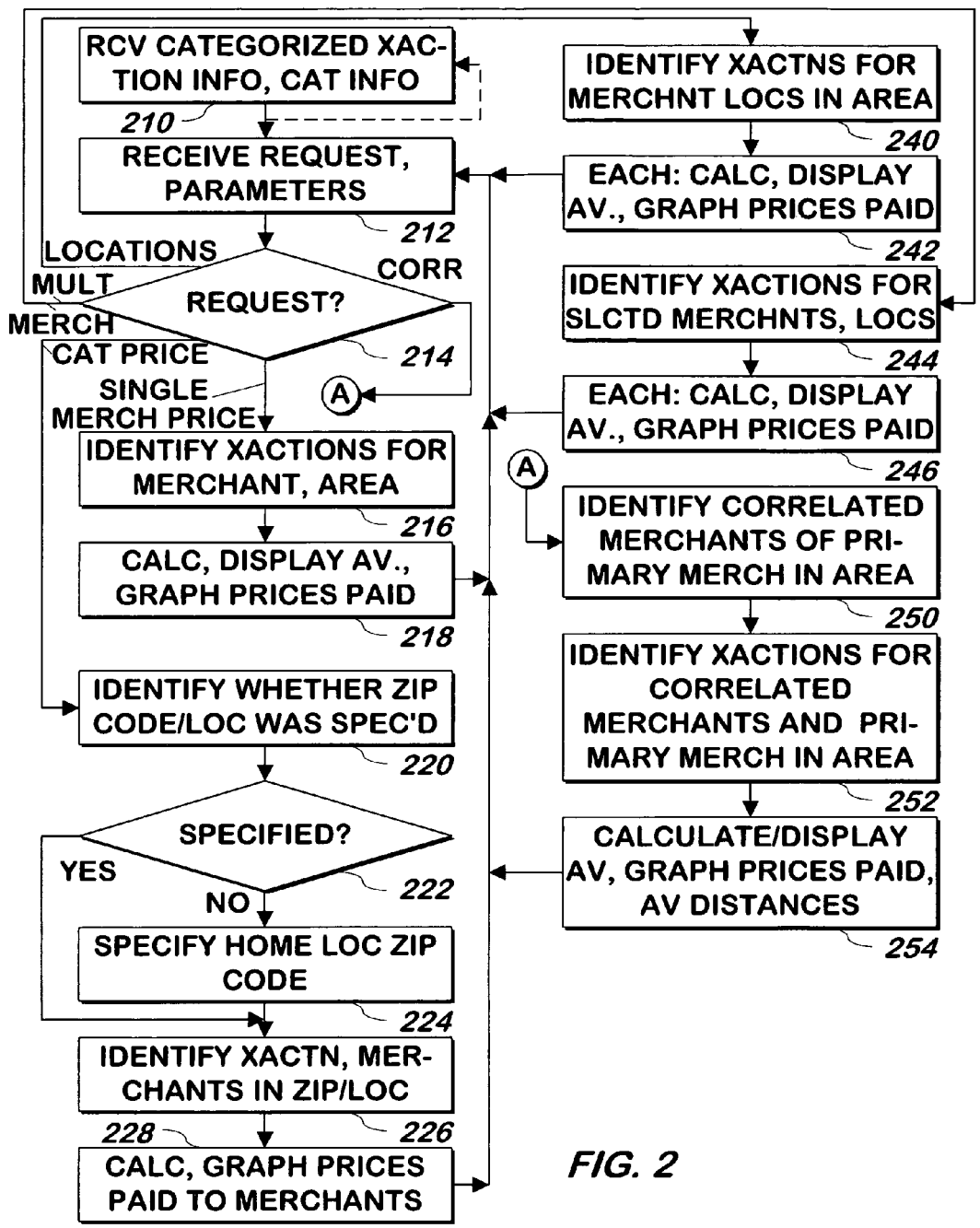
FIG. 2 is a flowchart illustrating a method of identifying pricing information according to one embodiment of the present invention.

FIG. 2 is a flowchart illustrating a method of identifying pricing information according to one embodiment of the present invention. Referring now to FIG. 2, categorized transaction information, each detailing transactions between one of several customers with one of several merchants, is received from one or more sources 210. The sources may include servers of financial institutions that are used by customers who may be consumers of products and/or services, including businesses, to make purchases. Such transaction information is received via a network, such as the Internet, from such sources, categorized, optionally assigned to a merchant name and location and stored associated with an identifier of a customer as described in the related application. In one embodiment, information from hundreds, thousands or tens of thousands of customers is received and processed in this manner, so that for a given metropolitan region, categorized transaction data is available from hundreds or thousands or tens of thousands of customers. The transaction data involves transactions of these customers with hundreds of merchants.

The transactions may include transactions that are made via the financial institutions via one or more credit instruments such as conventional VISA and/or MASTERCARD credit or debit cards or other credit or debit charge cards or other forms of payment processing such as conventional PAYPAL accounts. The transactions may include transactions that are made by other forms of payment, including check or bank transfers.

In one embodiment, each customer of a merchant that corresponds to the transaction information received has identified himself or herself, and identified his or her home location and/or work or other location, and such information is received as part of step 210. In addition, some or all customers have given permission to the recipient to collect their transaction information into a single database or single logical database from one or more financial institutions and use the transaction information, such as in the manner described herein. For example, a customer may have signed up for a service that provides summary financial information about the user's transactions, such as credit card or debit card transactions or both, and the service retrieves the information about transactions for each such customer posted to accounts corresponding to one or more types of cards from one or more financial institutions that the customer specifies. The transaction information is collected from the financial institutions or provided by the customers, categorized and associated with a merchant name identified as described in the related application, associated with an identifier of the customer to which it corresponds, and all such information is stored. The transaction information may include an identifier of the merchant (such identifier may or may not be unique among other merchants, and the merchant name may be further identified), optionally the merchant location, and includes the transaction amount, date, and optionally the time of the transaction, and may include other information as described herein.

In one embodiment, some or all of the transaction data is collected from parties other than the merchant. Such data may not be categorized when received, and every merchant corresponding to the transaction data may not be identifiable with certainty from the transaction data alone.

In one embodiment, as part of step 210, customers of the merchants supply information that allows the transaction data for that customer that corresponds to transactions with multiple merchants to be retrieved from the servers of one or more financial institutions that store and provide it. For example, the identifier of a financial institution, an account name and password may be received from the customers who wish their transaction information to be retrieved from that financial institution. In one embodiment, all of a customer's transaction information related to one or more credit cards and/or one or more financial institution accounts is retrieved from servers of the financial institution corresponding to the identifiers received, allowing retrieval of transaction information regarding multiple merchants for each customer that authorizes it. The identifier of the web address of each server to use may be looked up from a table or it may be some or all of the identifier of the financial institution provided by the user. The customer may identify additional transaction data, such as that regarding cash transactions the customer has made.

In one embodiment, step 210 also includes receiving category information, for example, not just the category of each transaction, but also names of the available categories. Other category information may be received as described in more detail herein. Step 210 may also include identifying the merchant name with more certainty. Some or all of such information may be received as described in the related application.

In one embodiment, step 210 operates as a continuously or periodically running process, for example, nightly, as shown by the dashed line in the drawing.

One of several types of requests for pricing information is received, and any optional parameters for that type of request are received 212. The different types of requests and their parameters are described in more detail herein and below.

Single Merchant Request.

One type of request is a single merchant request. A single merchant request allows the requestor to see a statistical and graphical summary of pricing information about a single merchant as described in more detail below. The name and optional synonyms of the merchant about which pricing information is being requested, and an optional area definition may be received as parameters to the request.

In one embodiment, the identification of the merchant name and synonyms is an iterative process. The requestor provides a name and selects a category. Similar names of merchants corresponding to transactions of the same category are identified and displayed to the requestor, and the requestor selects the similar names that may correspond to that merchant. The similar names may include the merchant name that is received with any transaction that was categorized as being in the same category as the name provided by the requestor (which may be looked up in the database of names and categories described in the related application). In one embodiment, the merchant name of the reverse intersecting matched business name or names identified (and used to when the category of the merchant is identified as described in the related application) is used as the merchant name in each transaction, when transactions are identified as described herein. In one embodiment, the requestor can then select which of these names should be used.

If the request is for pricing information for a single merchant 214, the method continues at step 216. The area may be defined using one or more city names, the name of one or more subregions of a metropolitan region (for example, one that includes and/or excludes certain cities or zip codes) or a metropolitan region name (that may include and/or exclude certain cities or subregions or zip codes) or one or more zip codes, or by digitally drawing boundaries on a digital map, which is then parsed to identify the boundaries and convert the boundaries into latitude and longitude coordinates, which may then be used to compare to an address database that includes such latitude and longitude coordinates. Because the location of transaction data may not be zip code specific, the request may include an agreed upon method of identifying a zip code of a transaction from the zip code of the consumer who made the transaction, such as assuming that a transaction identified as being in a city within ten miles of the zip code of the any residence of the customer, will be considered to have been made in any zip code within ten miles of such one or more residences that includes the city identified in the transaction information. In one embodiment, transactions for which no location is identified, or one which repeats regularly from a distant location may be considered to have been made in any zip code within ten miles of the residence of the customer.

At step 216, transactions for the merchant corresponding to the request are identified by matching the names and synonyms to the name of the merchant in the transaction data. The identification of the transactions may include including limiting the transactions identified to any merchant locations that meet the area definition, such locations being identified, though not always accurately or with certainty, from the transaction information.

Illustrative representations for the transactions received in step 210 that correspond to the transactions identified as described above, such as a bar chart of prices paid per transaction, are calculated and prepared using conventional techniques, and one or more statistics about the transactions identified as described above, such as the average price per transaction, are also identified and the illustrative representations and the one or more representations and/or statistics are displayed 218, and the method continues at step 212, where an additional request may be received and processed as described herein. The details of the display of statistics and graphical information are described in more detail with reference to FIG. 3. In one embodiment, part of step 218 may include displaying a map that includes icons displayed at the locations of the transactions identified so that the user can identify if the locations identified were those to which the user wished the request to correspond.

The display of data may include storage at a server of representations of such data, and generation of one or more web pages containing such representations, which are stored and then provided via a network such as the Internet for display to the user using a computer containing a conventional browser. The browser then receives the web page or pages, stores it in a tangible computer media, renders the web page, stores the rendered web page and provides it to a conventional computer display. The computer may be a personal computer, cell phone or other computing device.

Because the number of transactions may be large, and the number of customers for which the transaction information is obtained may be large, the number of transactions and number of customers for a merchant in any specified area may be large enough to provide meaningful data to a requestor, and such information may be used as described below.

In one embodiment the transaction data used to perform step 216, 218 and other steps is filtered, using only transaction data during a specific period (e.g. in the past month or year), and/or different data from different dates may be weighted differently based on the date of the transaction, or its age from the current date. The filter and/or weightings may be specified in the request received in step 212 (or retained from a prior request, or default filters or parameters may be used, with the user having the optional ability to alter them) as a function of the category information received in step 210. The category of the merchant specified is then used to identify the filter and weightings used. This allows, for example, transactions for certain categories (e.g. cellular phones) to be used for the calculations for the past 6 months or a year, with more recent months' transactions weighted more heavily than less recent months' data, while transactions of other categories (e.g. florist shops) for the past two years may be used for calculations, with the same month as the current month in any year weighted more heavily than other months. In other embodiment, the weightings may be more precisely specified for each category, for example, allowing purchases within a month of mother's day in any year for the past three years to be weighted more heavily than other days.

In one embodiment, weightings and filters may be instead or additionally supplied by the requestor as one or more parameters.

The method continues at step 212.

Category Price Request.

Another type of request is a category price request. A category price request allows the requestor to see pricing for all businesses in a specified category in a selected area. In one embodiment described in more detail below, such a request causes the method to operate similarly to that described above, but all businesses in the category that operate in the area are identified automatically and then the information described above is provided for each such business. Parameters for the category price request may include a category identifier and an area. The area may be specified or identified as described herein.

If the request is a category price request 214, the method continues at step 220. At step 220, a determination is made whether an area was specified with the request. If so 222, the method continues at step 226. Otherwise 222, an area around a home location that was specified by the requestor is used as the area 224. The area so used may be specified for each category as part of step 210, so that the area for the grocery stores category may be smaller than the area for the cellular phone providers category.

The category may be selected from a list of available categories.

Transactions corresponding to the category name and the area received with the request (or the home location used) are identified, and for each merchant corresponding to such transactions, or each location of each merchant, the average transaction for that merchant or location is identified 226. A merchant corresponds to the request if it is part of a transaction corresponding to its location or one of its locations in the area or is deemed to have one there as described above, and if the merchant is categorized in the category corresponding to the request, for example, using a categorized database of merchants, such as are commercially available. The amount of each transaction at that merchant or at that location or locations is used as described herein to display 226 statistics or graphics corresponding to the transactions identified, such as a bar chart, as described in more detail with reference to FIG. 3. In one embodiment, the merchants are displayed as lettered balloons on a map showing the locations of the merchants, with a key to the letters identifying the name and address of each merchant and location, and bar charts and averages for a merchant or location pop up as the user hovers a mouse cursor near a lettered balloon on the map. In one embodiment, a conventional business directory database may be used to identify the exact address of the locations to be plotted on the map.

The averages and bar charts and other illustrations described above may be identified using all locations for a merchant or all locations in the area for a merchant, at which point if multiple locations for the same merchant exist in the area or the user's home location, the bar charts for a given merchant will be the same, or the averages and bar charts for a location may be computed based on the transactions from that location.

The method continues at step 212.

Locations Request.

Another type of request is a request for pricing information by location. A locations request identifies averages and charts for multiple locations of a single merchant. The merchant name and area may be received as parameters to the request. In one embodiment, synonyms to the merchant name corresponding to the request may also be received as parameters or the identified name may be used, as described above. The area may be specified as described above.

If the request is a request for pricing information by location 214, the method continues at step 240. At step 240, transactions corresponding to the merchant locations corresponding to the area and merchant name received with the request are identified, and the transactions are sorted by location. In one embodiment, the default area may be used if no area is specified, as described above. For each such location, the transaction data received in step 210 corresponding to such merchant name or names and locations, optionally filtered and weighted based on the category for that merchant as described above, is used to identify and display 242 statistics and graphical information for each location as described herein and with reference to FIG. 3, with the transactions corresponding to a location used for such statistics and graphs for that location.

The statistics may include the average transaction price, the number of transactions a user who has at least one transaction with that location makes with the same merchant and the same location, on average, in a period of time (which may differ based on the category, with the period of the category specified for each category and received with the category information as described above), the average number of transactions that a user who has at least one transaction with that location in a month makes with the same merchant but one of the other locations in the period, and the average distance from the location the party making any transaction with that location identifies as a residence location or a work location or both.

In one embodiment, the time is included in the transaction information received, and that time, and the type of day of the transaction is considered in determining whether the transaction was a transaction likely to be made on the way to or from work, and such transactions are used to determine the average distance from work, while other transactions are used to determine the average distance from the customer's residence, such locations of residence and work having been provided by each customer as part of step 210. In another embodiment, all transactions are considered to be from the customer's residence. The time and type of days used for the distance to work calculations may be times between 9 am and 7 pm on nonholiday weekdays, with a list of such days being received with the transactions as part of step 210. Distance to work and home are both reported, as are the average number of each type of transaction, with the average being displayed as the number of transactions that any person who made at least one of any type of transaction with a merchant location makes per month.

Bar charts and statistics, such as those described herein, are identified and provided for display 242 for each location, with the locations plotted on a map as described above. The bar charts and averages may be displayed together, for example, using stacked bar charts or three dimensional bar charts, to facilitate ease of comparison among the locations.

The method continues at step 212.

Multiple Merchant Request.

Another type of request is a multiple merchant request. A multiple merchant request operates like a single merchant request, but allows multiple merchant names to be specified as parameters to the request instead of a single merchant name. The request includes the name and optionally synonyms of the merchants as described above, and optionally, the area to which the request corresponds, as described above. The merchants may correspond to different categories or the same categories, allowing two or more categories to be spanned, or some merchants to be eliminated from a category, using this type of request as compared to a category request.

If the request is a multiple merchant request 214, the method continues at step 244. At step 244, the transaction information corresponding to the merchant names and corresponding the area received with the request (or a default area as described above) are identified. The transaction information for each merchant is used to identify, for each such merchant in the area, the average transaction price, number of monthly transactions per person making any such transaction with the merchant, and driving distance from the customer's home or work as described above, and such information is displayed for each such merchant. Also as part of step 244, graphical information, such as a bar chart showing the percentage of customers spending different amounts for each of those merchants, is displayed 244. Such statistics and graphical information may be computed and displayed as part of step 244 as described in FIG. 3.

In one embodiment, the graphical information includes conventional three-dimensional bar charts or stacked bar charts showing the graphical information for all merchants simultaneously so that comparison between each of the merchants corresponding to the request is facilitated.

The statistics and graphical information may be displayed as part of a map as described above, with locations for each merchant labeled on a map, with a key that identifies the merchants, and when the requestor hovers a mouse cursor over the merchant name on the key, the statistics and graphical information for that merchant may be displayed. The address of the merchants corresponding to the request may be looked up in a conventional business directory database and such addresses are used to plot the locations on the map.

Correlated Merchant Request.

Another type of request is a correlated merchant request. A correlated merchant request allows the requestor to supply the name of one merchant, referred to as the "primary merchant" and one or more other merchants, referred to as "correlated merchants" are identified, and statistics and graphical information are displayed for the primary merchant and each of the correlated merchants. A merchant is a correlated merchant of a primary merchant if a threshold percentage of customers of the correlated merchant are also customers of the primary merchant. In one embodiment, a correlated merchant request includes the name of a primary merchant, optional synonyms for the primary merchant, an area definition as described above (including a default area if none is specified), and optionally a correlation threshold.

If the request is a correlated merchant request 214, the method continues at step 250. At step 250, correlated merchants of the primary merchant are identified using the transaction data to determine if a threshold percentage of the customers having a transaction with the primary merchant also had a transaction with any other merchant within a window of time, such as 30 days before or after the transaction with the primary merchant, for merchants in any area specified. In other embodiments, other sized windows of time may be used. The window may be specified as a parameter to the request, or the window may be a function of the category of the primary merchant, which is identified using the categorized transaction information. Such windows for all categories may be provided with the category information in step 210.

In one embodiment, the request may contain a distance limitation as a parameter so that transactions by one customer of a merchant that may potentially be a correlated merchant are only considered for the correlation analysis if the that merchant is within a distance limitation of a location of the primary merchant with which that customer had a transaction, even if the merchant that may potentially be a correlated merchant is within the area.

The filtering and weighting for the category with which the primary merchant is associated, as described herein, may be used and applied to all other merchants, even those outside of that category, when performing the correlation.

Transactions for the primary merchant and each of the correlated merchants are identified 252. In one embodiment, transactions are identified for a period corresponding to the category of the primary merchant.

The average prices and distances are calculated and displayed for the primary merchant and the correlated merchant or merchants as described above. In one embodiment, the user may specify that certain of the correlated merchants are displayed as if they are a single correlated merchant, so that if such a merchant uses multiple names, the transactions for that merchant will be treated as being made with that single merchant instead of multiple merchants using the various names. The identified name of the merchant may also be used to group transactions that were received with different names. Graphs showing distributions of prices paid may also be displayed as described above. The displays of graphs may be done in the form of a three dimensional graph or stacked bar chart as described above, with pricing distributions for the primary merchant and each of the correlated merchants displayed together as described above.

In one embodiment, the transaction data used to build the graphs or average prices or distances calculated and displayed may be filtered by the requestor to illustrate only those persons who did or who did not have transactions at both the primary and the correlated merchant or merchants, for any correlated merchant the requestor selects. Such filtering may be designated as a parameter with the request.

In one embodiment, some or all of the transaction data may be preprocessed before a request is received, and the request may be performed on the preprocessed data. For example, each day, statistics for each merchant may be computed using all transaction data for that day, and the request may be fulfilled using the statistics instead of the transaction data.

Calculations.

Figure 3:
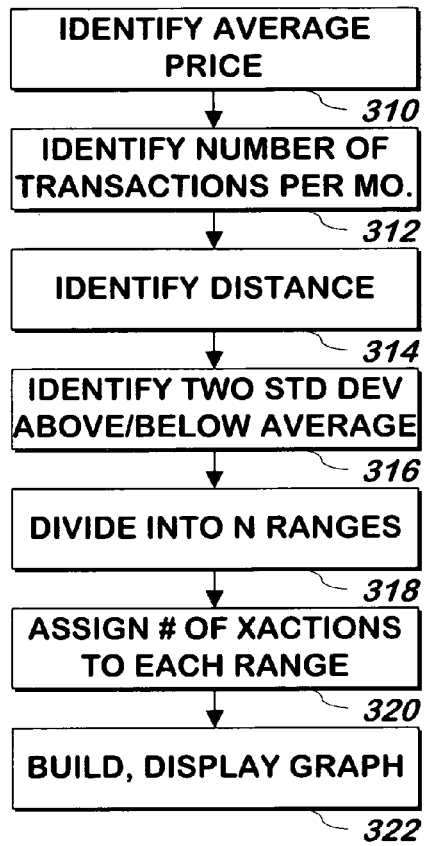
FIG. 3 is a flowchart illustrating a method of calculating and displaying pricing information according to one embodiment of the present invention.

Referring now to FIG. 3, a method of calculating statistics and preparing graphical information for identified transaction information is shown according to one embodiment of the present invention. The average price of the identified transaction information is identified 310 by adding the amounts of each of the identified transactions (e.g. for a single merchant) and dividing by the number of identified transactions. In one embodiment, the highest and lowest N % of the transaction amounts are eliminated from consideration (with N=1, 3 or 5 in various embodiments), and the number of transactions is reduced accordingly. As noted above, the transactions may be filtered and/or weighted, and the average amount of the transactions excludes the transactions filtered and/or accounts for the weights by weighting the price of the transaction before summing it, and summing the weights applied to each transaction instead of counting the transactions, and using the sum of the weights to divide the weighted sum of the transaction price to produce the average, though other conventional techniques of identifying a weighted average may be used.

The number of transactions the average person who transacts with a merchant makes with that merchant is identified 312 using the transaction data, for example, by sorting the transaction data by the identifier of the customer to which the transaction corresponds, identifying the number of customers to which the transactions correspond, and dividing the number of identified transactions by the number of identified customers. Again, the filtered transactions are ignored, and/or the numbers described above may be weighted, for example, according to the date of the transaction.

The average distance between the customer's home location or work location, and the merchant location is identified 314 as described above. The home location may be the address of the customer's residence. The customer may have supplied their home and/or work locations and these may be located in a conventional map database to identify a latitude and longitude of either or both locations. The address of the merchant may be identified from the business database when the transaction is categorized as described in the related application, and the latitude and longitude may be looked up from the address as described above. The distance may then be computed by taking the difference of latitudes and longitudes and then using conventional conversion techniques to convert to miles or other distances.

The graph of prices paid may be made using any conventional graphing technique using the prices from the identified transaction data, optionally filtered and weighted as described herein. One such technique will now be described. The prices two standard deviations above and below the average price are identified 316, and N ranges of prices that encompass the range that includes the two standard deviations are identified 318 such that ranges are selected from an identified set of ranges of $1, $2, $2.50, $5, $10, $20, $25, $50, $100, or $500, and 1000 times any of these, so that the N ranges include the two standard deviations, with the amount outside of the two standard deviations not more than any other potential ranges. In one embodiment, N=5, though other values of N may be used.

The number, optionally weighted as described herein, of the identified transactions having prices corresponding to each of the N ranges are identified and assigned 320 to the corresponding range. If a weighted number is used, the results may be normalized by dividing by the sum of the weights corresponding to the transactions of all ranges.

The bar graph is then built and displayed 322 using the N ranges and the number of transactions assigned to the ranges using conventional graphing techniques.

It is possible that a single merchant may be identified using different names. In one embodiment, the use of reverse intersecting matched business names to identify the merchant for a transaction, instead of the identifier provided with the transaction, may prevent different names from being used as the merchant names of different transactions. In one embodiment, any of the steps of FIG. 2 (including those that refer to calculation and/or graphing) may include providing a user with similar names that have been assigned to similar categories and allowing the user to combine different names into the same merchant, and then the calculations proceed on the basis that the several combined business names are a single merchant. Thus, for example, if Macy's operates under several different names, the transactions for all such merchants may be used as described herein as if they had originated from a single merchant.

Uses of the Results.

Figure 4:
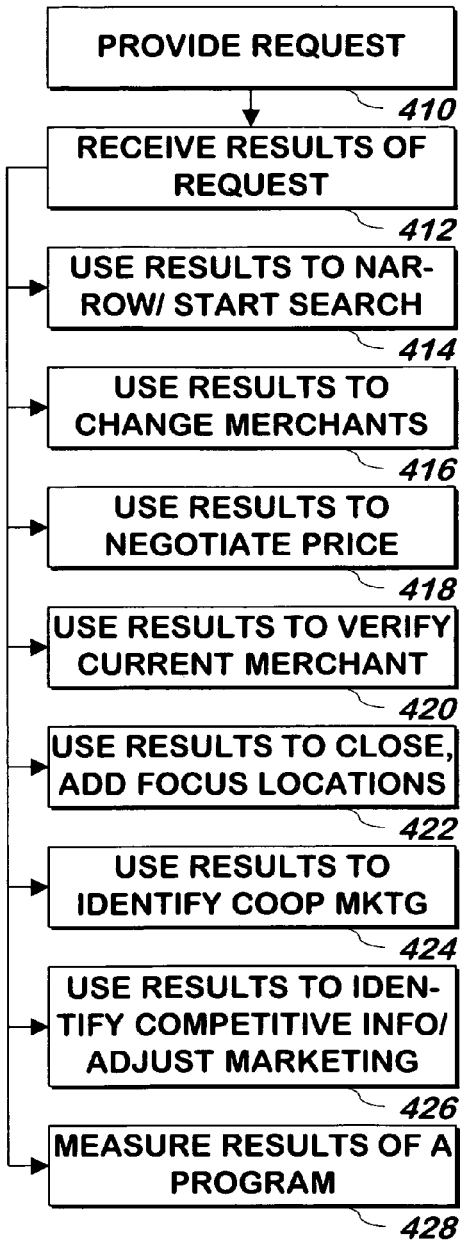
FIG. 4 is a flowchart illustrating a method of using pricing information according to one embodiment of the present invention.

Customers and merchants may use the results of a request for any of a variety of purposes, some of which will now be described. Referring now to FIG. 4, a method of using the results of any of the requests described herein is shown according to one embodiment of the present invention.

A request may be provided 410, for example, by a customer of merchants whose transactions are received as described above or by a merchant corresponding to one or more, but not all, of the transactions or none of the transactions, or a potential merchant corresponding to none of the transactions. The customer need not be a current customer of any merchant corresponding to the request. Any request described herein may be provided as part of step 410.

The results of the request are received 412 and the results are then used as described below to effectuate a business transaction, assist with a business decision, or both. Any or all of the uses described below may be made of the results of any one or more requests, and the uses are not limited by those described herein. In one embodiment, the recipient of the results of the request uses a personal computer coupled to a first server over a network to make the request and receive the results, and uses one or more different servers to perform some or all of the other actions described herein.

The results may be used to start or narrow a search and display information 414 for a merchant supplying a product or service of interest. The results may be used to change merchants 416 from one supplying one or more products and/or services to a different one or more merchants that supply some or all of those one or more products and/or services. Changing merchants may include providing information to sign up with, and/or receiving a tangible product or service from the merchant, using the product and/or service to operate a device such as a cell phone, television or computer system, and being charged and paying an amount of money for such product or service. The results may be used to negotiate with a merchant a price 418 for one or more products and/or services either based on the prices paid to that merchant or prices paid to other merchants, and to receive a lower price for one or more products and/or services than is being paid or being offered. The results may be used to verify 420 that a merchant with which a customer is doing business is providing a competitive price for the products and/or services being consumed by comparing displayed prices or other information described herein.

The results may be used by a merchant to close or add physical locations for providing products or services or to focus marketing or management efforts on a particular location or locations, such as by providing marketing materials or altering visual or audible marketing materials to include an indication of a location or to place marketing materials at a location differently than what may have occurred without the results of the request, or to measure progress (e.g. of a marketing campaign) or reward one or more people for improvement of such results 422. The results may be used to identify 424 a merchant with which a cooperative marketing arrangement may be entered and for which the marketing arrangement is promoted using visually perceptible or audibly perceptible advertising.

In one embodiment all results are displayed on a physical display device, such as a conventional monitor of a computer system running a conventional browser.

The results may be used to identify information about a competitor, and then such results may be used to adjust a marketing campaign, for example, by changing a price or a description of a set of services, or by targeting advertisements directed to customers of a competitor 426. The results may be used to measure 428 results of a marketing or promotion or other program and then to modify the program, for example by changing a written description of the program. Many other uses of the results of a request may be employed for any business purpose to improve profitability or increase sales, or for any consumer purpose to assist with or confirm a purchase.

System.

Figure 6:
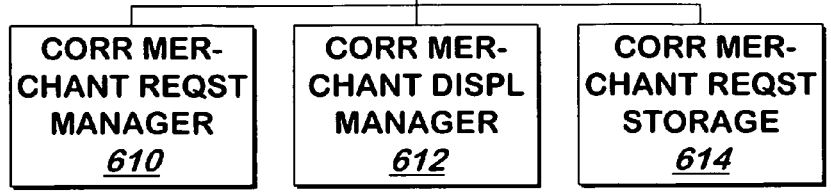
FIGS. 5 and 6 are a block schematic diagram of a system for identifying and displaying pricing information according to one embodiment of the present invention.
Figure 5:
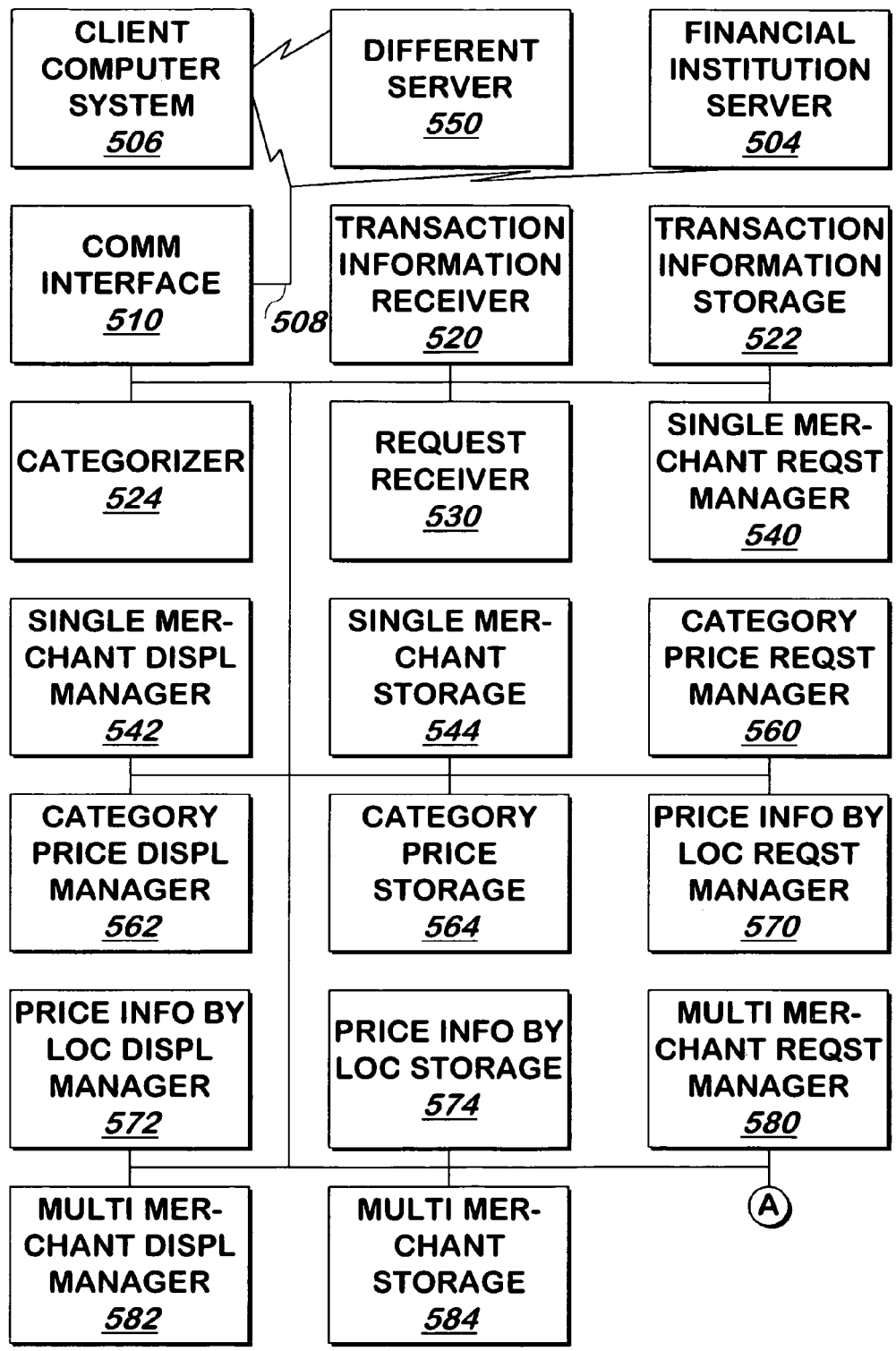

Referring now to FIGS. 5 and 6, a system for storing and displaying data responsive to requests is shown according to one embodiment of the present invention. Communication interface 510 includes a conventional communication interface, such as an Ethernet interface running suitable communication protocols, such as TCP/IP and other conventional communication protocols. In one embodiment, all communication into or out of the system of FIGS. 5 and 6, excluding elements 504, 506 and 550, is made via input/output 508 of communication interface 510. Each of those elements is coupled to communication interface 510 via a network such as the Internet and a similar or identical communication interface (not shown).

A user uses a client computer system 506 to communicate with communication interface 510, for example using a browser on client computer system 506. There may be any number of client computer systems communicating with communication interface 510 via a network such as the Internet at the same time or at different times.

Transaction information receiver 520 receives transaction information from one or more computer servers 504 of one or more financial institutions and from the user via client computer system 506 as described above and timestamps and stores such transaction information in transaction information storage 522, which may include conventional memory or disk storage. Periodically, categorizer 530 appends in transaction information storage 522 a category and optionally one or more reverse intersecting matched business name corresponding to the highest scoring entry as described in the related application to each transaction stored therein.

Request receiver 530 provides a web page containing a user interface that allows the user to specify any of the types of requests described herein. The user clicks a link corresponding to the request desired, and request receiver 530 receives the specified request. If the request is a single merchant request, request receiver 530 provides the IP address of the requester and port to single merchant request manager 540. If the request is a category price request, request receiver 530 provides the IP address of the requester and port to category price request manager 560. If the request is a pricing information by location request, request receiver 530 provides the IP address of the requester and port to price information by location request manager 570. If the request is a multiple merchant request, request receiver 530 provides the IP address of the requester and port to multiple merchant request manager 580. If the request is a correlated merchant request, request receiver 530 provides the IP address of the requester and port to correlated merchant request manager 610.

Single Merchant Request.

Single merchant request manager 540 uses the IP address and port to provide a user interface to the user requesting the name of the merchant, and any other parameters (e.g. area, etc.) as described above. Single merchant request manager 540 receives the parameters, including the name, and identifies any potentially similar names corresponding to the name received as described above. Single merchant request manager 540 provides the potentially similar names to the user via a web page that allows the user to select any other names that will be treated as the single merchant or select a similar identified name, as described above. Such names may be filtered by single merchant request manager 540 before presenting them to the user, to ensure that the number of potentially matching names is not too large, for example, by insuring that only potentially matching names having a certain number of matching characters in the same order as the name received are used as potentially matching names. Single merchant request manager 540 receives the response from the user when the user presses a submit button, and identifies the matching names to use.

Single merchant request manager 540 then identifies in transaction information storage 522 the transactions corresponding to the request (including the name and any similar names, and any parameters such as area, or identifies a default area) as described above. In one embodiment, request receiver 530 assigns each request a serial number and provides a user identifier it requests and receives from the user and the serial number of the request to single merchant request manager 540 when it signals single merchant request manager 540 and single merchant request manager 540 associates the user identifier and serial number with each transaction that corresponds to the request (and is optionally not older than a threshold amount of time from the request, such threshold being optionally identified via a table of thresholds to categories of the name or names corresponding to the request that single merchant request manager 540 internally stores).

When it has completed marking the transactions as described above, single merchant request manager 540 signals single merchant display manager 542 for example, with the IP address and port of the requestor and the user identifier and serial number of the request.

When it receives the IP address and port of the requestor and the user identifier and serial number of the request, single merchant display manager 542 builds in single merchant storage 544 as one or more web pages the illustrative representations and statistics of the transactions marked using the user name and serial numbers, and provides the web page to the client computer system 506 using the IP address and port it received, as described above. Links to the other web pages used to provide such information may be included on any web pages provided, and when the user clicks the link, a request is sent from the user's browser to single merchant display manager 542, which builds the page into single merchant storage 544 (if such page was not already built) and provides the requested page to the client computer system 506. In one embodiment, the web pages contain a link to request receiver 530. If the user clicks the link, request receiver 530 provides the web page to the client computer system 506 to the client computer system 506 allowing a request to be made as described above.

The user may then use the information on the one or more web pages provided by single merchant display manager 542 to perform the actions described below using different server 550.

In one embodiment, any of the request managers described herein may periodically, such as daily, identify every possible subject of a request (e.g. a merchant, primary merchant, category, etc.) using the smallest area possible, and for every possible area of every subject, mark the transactions corresponding to that request as described herein and then signal the corresponding display manager to preprocess the transactions and store preprocessed results in transaction information storage 522. The parameters selected by the request manager may be provided to the display manager and stored by the display manager with the preprocessed results along with the period to which the preprocessed results correspond. In such embodiment, when an actual request is received, the request manager may mark the preprocessed results to be used, and any transactions not part of the preprocessed results, and provide the parameters and the user identifier and serial number to the corresponding display manager as described herein, which uses the preprocessed results to identify the actual results of the request instead of the transaction data corresponding to the preprocessed results. The most recent transaction data not already preprocessed may be used as described herein in addition to the preprocessed results to identify the results of the request.

For example, the average transaction and distribution of transactions for every merchant in every zip code may be identified and stored for every day, in advance, and such information may be used if possible, to fulfill the request.

Category Price Request.

Category price request manager 560 uses the IP address and port it receives as described above to provide a user interface to the user requesting the category and optionally, the area or allowing the user to select a default area as described above. Category price request manager 560 receives the category any area or identifies the default area as described above.

Category price request manager 560 then identifies in transaction information storage 522 the transactions corresponding to the request (including the category and area) as described above. In one embodiment, request receiver 530 assigns each request a serial number and provides a user identifier it requests and receives from the user and the serial number of the request to category price request manager 560 when it signals category price request manager 560 and category price request manager 560 associates the user identifier and serial number with each transaction that corresponds to the request (and is optionally not older than a threshold amount of time from the request, such threshold being optionally identified via a table of thresholds to categories of the name or names corresponding to the request that category price request manager 560 internally stores).

When it has completed marking the transactions as described above, category price request manager 560 signals category price display manager 562 for example, with the IP address and port of the requestor and the user identifier and serial number of the request.

When it receives the IP address and port of the requestor and the user identifier and serial number of the request, category price display manager 562 builds in category price storage 564 as one or more web pages the statistics or graphics corresponding to the transactions marked using the user name and serial number, and provides the web page to the client computer system 506 using the IP address and port it received, as described above. Links to the other web pages used to provide such information may be included on any web pages provided, and when the user clicks the link, a request is sent from the user's browser to category price display manager 562, which builds the page into category price storage 564 (if such page was not already built) and provides the requested page. In one embodiment, the web pages contain a link to request receiver 530. If the user clicks the link, request receiver 530 provides the web page to the client computer system 506 allowing a request to be made as described above.

The user may then use the information on the one or more web pages provided by category price display manager 562 to perform the actions described below using different server 550.

Pricing Information by Locations Request.

Pricing information by location request manager 570 uses the IP address and port to provide a user interface to the user requesting the name of the merchant, and any parameters (e.g. area, etc.) as described above. Pricing information by location request manager 570 receives the parameters, including the name, and identifies any potentially similar names corresponding to the name received as described above. Pricing information by location request manager 570 provides the potentially similar names to the user via a web page that allows the user to select the names that will be treated as the identified or similar names for the merchant corresponding to the request. Such names may be filtered by pricing information by location request manager 570 before presenting them to the user, to ensure that the number of potentially matching names is not too large, for example, by insuring that only potentially matching names having a certain number of matching characters in the same order as the name received are used as potentially matching names. Pricing information by location request manager 570 receives the response from the user when the user presses a submit button, identifies the matching names to use.

Pricing information by location request manager 570 then identifies in transaction information storage 522 the transactions corresponding to the request (including the name and any similar names, and any parameters such as area, or identifies a default area) as described above. In one embodiment, request receiver 530 assigns each request a serial number and provides a user identifier it requests and receives from the user and the serial number of the request to pricing information by location request manager 570 when it signals pricing information by location request manager 570 and pricing information by location request manager 570 associates the user identifier and serial number with each transaction that corresponds to the request (and is optionally not older than a threshold amount of time from the request, such threshold being optionally identified via a table of thresholds to categories of the name or names corresponding to the request that pricing information by location request manager 570 internally stores).

When it has completed marking the transactions as described above, pricing information by location request manager 570 signals pricing information by location display manager 572 for example, with the IP address and port of the requestor and the user identifier and serial number of the request.

When it receives the IP address and port of the requestor and the user identifier and serial number of the request, pricing information by location display manager 572 builds in pricing information by location storage 574 as one or more web pages the statistics and graphical information for each location corresponding to the transactions marked using the user name and serial number, and provides the web page to the client computer system 506 using the IP address and port it received, as described above. Time and type of day may be used as described above. Links to the other web pages used to provide such information may be included on any web pages provided, and when the user clicks the link, a request is sent from the user's browser to pricing information by location display manager 572, which builds the page into pricing information by location storage 574 (if such page was not already built) and provides the requested page. In one embodiment, the web pages contain a link to request receiver 530. If the user clicks the link, request receiver 530 provides the web page to the client computer system 506 allowing a request to be made as described above.

The user may then use the information on the one or more web pages provided by pricing information by location display manager 572 to perform the actions described below using different server 550.

Multiple Merchant Request.

Multiple merchant request manager 580 uses the IP address and port it receives as described above to provide a user interface to the user requesting the name of the merchants, and any other parameters (e.g. area, etc.) as described above. Multiple merchant request manager 580 receives the parameters, including names, and identifies any potentially similar names corresponding to the name received as described above. Multiple merchant request manager 580 provides, for each merchant identified by the user, the potentially similar names to the user via a web page that allows the user to select the names that will be treated as that merchant. Such names may be filtered by multiple merchant request manager 580 before presenting them to the user, to ensure that the number of potentially matching names is not too large, for example, by insuring that only potentially matching names having a certain number of matching characters in the same order as the name received are used as potentially matching names. Multiple merchant request manager 580 receives each response from the user when the user presses a submit button, identifies the matching names to use.

Multiple merchant request manager 580 then identifies in transaction information storage 522 the transactions corresponding to the request (including the names of the multiple merchants and/or any similar names, and any parameters such as area, or identifies a default area) as described above. In one embodiment, request receiver 530 assigns each request a serial number and provides a user identifier it requests and receives from the user and the serial number of the request to multiple merchant request manager 580 when it signals multiple merchant request manager 580 and multiple merchant request manager 580 associates the user identifier and serial number with each transaction that corresponds to the request (and is optionally not older than a threshold amount of time from the request, such threshold being optionally identified via a table of thresholds to categories of the name or names corresponding to the request that multiple merchant request manager 580 internally stores).

When it has completed marking the transactions as described above, multiple merchant request manager 580 signals multiple merchant display manager 582 for example, with the IP address and port of the requestor and the user identifier and serial number of the request.

When it receives the IP address and port of the requestor and the user identifier and serial number of the request, multiple merchant display manager 582 builds in multiple merchant storage 584 as one or more web pages the statistics and graphical information corresponding to the transactions marked using the user name and serial number, and provides the web page to the client computer system 506 using the IP address and port it received, as described above. Links to the other web pages used to provide such information may be included on any web pages provided, and when the user clicks the link, a request is sent from the user's browser to multiple merchant display manager 582, which builds the page into multiple merchant storage 584 (if such page was not already built) and provides the requested page. In one embodiment, the web pages contain a link to request receiver 530. If the user clicks the link, request receiver 530 provides the web page to the client computer system 506 allowing a request to be made as described above.

The user may then use the information on the one or more web pages provided by pricing information by location display manager 572 to perform the actions described below using different server 550.

Correlated Merchant Request.

Correlated merchant request manager 610 uses the IP address and port to provide a user interface to the user requesting the name of the primary merchant, and any other parameters (e.g. area, etc.) as described above. Correlated merchant request manager 610 receives the parameters, including the name, and identifies any potentially similar names corresponding to the name received as described above. Correlated merchant request manager 610 provides the potentially similar names to the user via a web page that allows the user to select the names that will be treated as the similar names for the merchant corresponding to the request. Such names may be filtered by correlated merchant request manager 610 before presenting them to the user, to ensure that the number of potentially matching names is not too large, for example, by insuring that only potentially matching names having a certain number of matching characters in the same order as the name received are used as potentially matching names. Correlated merchant request manager 610 receives the response from the user when the user presses a submit button, identifies the matching names to use.

Correlated merchant request manager 610 then identifies in transaction information storage 522 the transactions corresponding to the request (including the name and any similar names of the primary merchant, and any parameters such as area, or identifies a default area) identifies the correlated merchants and identifies in transaction storage transactions for those correlated merchants corresponding to the request (including the area and/or window of time) as described above. In one embodiment, request receiver 530 assigns each request a serial number and provides a user identifier it requests and receives from the user and the serial number of the request to correlated merchant request manager 610 when it signals correlated merchant request manager 610 and correlated merchant request manager 610 associates the user identifier and serial number with each transaction that corresponds to the request (and is optionally not older than a threshold amount of time from the request, such threshold being optionally identified via a table of thresholds to categories of the name or names corresponding to the request that correlated merchant request manager 610 internally stores).

When it has completed marking the transactions as described above, correlated merchant request manager 610 signals correlated merchant display manager 612 for example, with the IP address and port of the requestor and the user identifier and serial number of the request.

When it receives the IP address and port of the requestor and the user identifier and serial number of the request, correlated merchant display manager 612 builds in correlated merchant storage 614 as one or more web pages the statistics and graphical information for each location corresponding to the transactions marked using the user name and serial number, and provides the web page to the client computer system 506 using the IP address and port it received, as described above. Time and type of day may be used as described above. Links to the other web pages used to provide such information may be included on any web pages provided, and when the user clicks the link, a request is sent from the user's browser to correlated merchant display manager 612, which builds the page into correlated merchant storage 614 (if such page was not already built) and provides the requested page. In one embodiment, the web pages contain a link to request receiver 530. If the user clicks the link, request receiver 530 provides the web page to the client computer system 506 allowing a request to be made as described above.

The user may then use the information on the one or more web pages provided by correlated merchant display manager 612 to perform the actions described below using different server 550.

Use of Different Server to Perform Related Action.

In one embodiment, a user may receive the information from any display manager 542, 562, 572, 582, 612 and use client computer system 506 to change a price or terms of an offer that is stored in a computer readable media on a different server 550 from the server on which such display manager 542, 562, 572, 582, 612 operates. The different server 550 may be a server of the merchant that is the subject of the request corresponding to the information provided by the display manager 542, 562, 572, 582, 612, a competitor of that merchant, or a different entity. The different server 550 may be one used by such an entity to advertise or promote a product or service, such as a web server or e-mail server, or a transaction server that is used to purchase and sell products and/or services. The different server 550 may be used to display the address of a new location that is added, or stop displaying an address of an old location that being discontinued, as a result of the search. The different server 550 may be used to print or display an announcement of a location that is being added, closed or both, resulting from the information displayed from the search. The different server 550 may be used to arrange a cooperative marketing arrangement with a different merchant who may be the subject of the search. The different server 550 may be used to identify and display information about a competitor who is the result of the search as described above. The search may be performed in response to display of information provided previously by the different server 550, for example to measure results of a change of information provided by or received by different server 550. The various activities may correspond to the subject of the search or to a location or business corresponding to the subject of the search. In one embodiment, the different server 550 is coupled to a network such as the Internet, as is the client computer system 506 and the server containing single merchant display manager 542 and the communication between these computer systems is made via the network.

The user may use the different server 550 to search for or receive information that is displayed on the user's client computer system communicating with the different server 550 and/or to verify a price or offering of, negotiate for, or sign up for, a product or service provided by the merchant corresponding to the request or a different merchant, stop receiving a service or product corresponding to that merchant or a different merchant, or both. In one such embodiment, the different server 550 includes two servers, one corresponding to the merchant that was the subject of the request and one corresponding to a different merchant.

What is claimed is:

1. A method of providing pricing information at a client device regarding a plurality of merchant transactions, comprising:
    receiving, at a transmission server, from a user at the client device, a request for pricing of a product, wherein the request is received over the Internet, and wherein the transmission server comprises a microprocessor and a memory;
    storing, in the memory of the transmission server, an IP address associated with the client device;
    triggering, using the stored IP address associated with the device, a display of a user-interface at the client device, wherein the user-interface facilitates specification of a merchant name by the user;
    receiving, using the displayed user-interface, from the user at the client device, a specification of a primary merchant and a specification of a correlation threshold;
    receiving, over the Internet, at the transmission server, transaction data from data sources associated with a plurality of merchants, wherein the transaction data comprises transactions between customers and the plurality of merchants, wherein the server stores the received transaction data;
    identifying, using the transaction data, one or more merchants such that a threshold percentage of customers of each of the identified one or more merchants are also customers of the specified primary merchant, wherein the threshold percentage is based on the specified correlation threshold;
    determining, from the transaction data, a subset of transaction data that involves transactions at the primary merchant as well as at the identified one or more merchants;
    providing, using the displayed user-interface at the client device, summary information associated with the determined subset of the transaction data;
    identifying a competitor merchant from the summary information; and
    displaying, at the client device, one or more web pages having one or more links to the identified competitor merchant; and
    upon activation of a link at a displayed web page, enabling the user to communicate with the identified competitor merchant over pricing information for the product.

2. The method of claim 1, wherein the identifying one or more merchants further involves identifying one or more merchants that are located in a predetermined geographical region.

3. The method of claim 2, wherein the summary information includes: a map of the predetermined geographic region, and locations of the primary merchant and the identified one or more merchants.

4. A system for providing pricing information at a client device regarding a plurality of merchant transactions, comprising:
    a memory;
    a processor;
    a receiving mechanism configured to receive at a transmission server, from a user at the client device, a request for pricing of a product, wherein the request specifies at least one primary merchant is received over the Internet, and wherein the transmission server comprises a microprocessor and a memory;
    a storage mechanism configured to store, in the memory of the transmission server, an IP address associated with the client device;
    a display mechanism configured to trigger, using the stored IP address associated with the device, a display of a user-interface at the client device, wherein the user-interface facilitates specification of a merchant name by the user;
    the receiving mechanism further configured to receive, using the displayed user-interface, from the user at the client device, a specification of a primary merchant and a specification of a correlation threshold;
    the receiving mechanism further configured to receive, over the Internet, at the transmission server, transaction data from data sources associated with a plurality of merchants, wherein the transaction data comprises transactions between customers and the plurality of merchants, wherein the server stores the received transaction data;
    an identifying mechanism configured to identify, using the transaction data, one or more merchants such that a threshold percentage of customers of each of the identified one or more merchants are also customers of the specified primary merchant, wherein the threshold percentage is based on the specified correlation threshold;
    a determining mechanism configured to determine from the transaction data, a subset of the transaction data that involves transactions at the primary merchant as well as at the identified one or more merchants;
    a providing mechanism configured to provide, using the displayed user-interface at the client device, summary information associated with the determined subset of the transaction data;
    the identifying mechanism further configured to identify a competitor merchant from the summary information; and
    the display mechanism further configured to display at the client device one or more web pages having one or more links to the identified competitor merchant; and
    an enabling mechanism configured to, upon activation of a link at a displayed web page by the user, enable the user to communicate with the identified competitor merchant over pricing information for the product.

5. The system of claim 4, wherein the identifying mechanism further involves identifying one or more merchants that are located in a predetermined geographical region.

6. The system claim 5, wherein the summary information includes: a map of the predetermined geographic region, and locations of the primary merchant and the identified one or more merchants.

7. A computer program product comprising a computer useable non-transitory medium having computer readable program code embodied therein for providing pricing information at a client device regarding a plurality of merchant transactions, the computer program product configured to cause a computer system to:
    receive, at a transmission server, a request from a user at a client device, for pricing of a product, wherein the request is received over the Internet, and wherein the transmission server comprises a microprocessor and a memory;
    store, in the memory of the transmission server, an IP address associated with the client device;
    trigger, using the stored IP address associated with the device, a display of a user-interface at the client device, wherein the user-interface facilitates specification of a merchant name by the user;
    receive, using the displayed user-interface, from the user at the client device, a specification of a primary merchant and a specification of a correlation threshold;

receive, over the Internet, at the transmission server, transaction data from data sources associated with a plurality of merchants, wherein the transaction data comprises transactions between customers and the plurality of merchants, wherein the server stores the received transaction data;

identify, using the transaction data, one or more merchants such that a threshold percentage of customers of each of the identified one or more merchants are also customers of the specified primary merchant, wherein the threshold percentage is based on the specified correlation threshold;

determine, from the transaction data, a subset of transaction data that involves transactions at the primary merchant as well as at the identified one or more merchants;

provide, using the displayed user-interface at the client device, summary information associated with the determined subset of transaction data;

identify a competitor merchant from the summary information; and display, at the client device, one or more web pages having one or more links to the identified competitor merchant; and upon activation of the link at a displayed web page by the user, enable the user to communicate with the identified competitor merchant over pricing information for the product.

8. The computer program product of claim 7, wherein the identifying one or more merchants further involves identifying one or more merchants that are located in a predetermined geographical region.

9. The computer program product of claim 8, wherein the summary information includes: a map of the predetermined geographic region, and locations of the primary merchant and the identified one or more merchants.

* * * * *